US011463520B2

(12) United States Patent  
Crowder

(10) Patent No.: US 11,463,520 B2  
(45) Date of Patent: Oct. 4, 2022

(54) SYSTEMS AND METHODS FOR STORING CONTENT ITEMS IN SECONDARY STORAGE

(71) Applicant: Level 3 Communications, LLC, Broomfield, CO (US)

(72) Inventor: William Crowder, Camarillo, CA (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

(21) Appl. No.: 16/859,918

(22) Filed: Apr. 27, 2020

(65) Prior Publication Data

US 2021/0211496 A1  Jul. 8, 2021

Related U.S. Application Data

(60) Provisional application No. 62/956,612, filed on Jan. 2, 2020.

(51) Int. Cl.
*H04L 67/1097* (2022.01)
*G06F 12/0866* (2016.01)
*H04L 67/5682* (2022.01)

(52) U.S. Cl.
CPC ...... *H04L 67/1097* (2013.01); *G06F 12/0866* (2013.01); *H04L 67/5682* (2022.05)

(58) Field of Classification Search
CPC ............ H04L 67/1097; H04L 67/2852; G06F 12/0866; G06F 3/0616; G06F 3/0679; G06F 11/1433; G06F 12/08; G06F 12/0802; G06F 2212/2022; G06F 2212/312; G11C 29/765; G11C 29/789

See application file for complete search history.

(56) References Cited

U.S. PATENT DOCUMENTS 7,984,328 B1 * 7/2011 Coatney .............. G06F 11/1084  
714/6.32  
2004/0086166 A1 * 5/2004 Weiss ...................... G06T 7/001  
382/141

(Continued)

OTHER PUBLICATIONS

"Cache replacement policies", *Wikipedia* XP055724087, Retrieved from the Internet: https://en.wikipedia.org/w/index.php?title=cache_replacement_policies&oldid=930744547; retrieved on Aug. 20, 2020; Section "Overview" Dec. 14, 2019 , 9 pgs.

(Continued)

*Primary Examiner* — Ninos Donabed

(57) ABSTRACT

Examples described herein relate to systems and methods for storing content items. The methods may be implemented by a computer comprising a processor, primary storage device, secondary storage, device and network interface. The primary storage device may receive, via the network interface, a plurality of content items responsive to respective requests from clients. The plurality of content items may be distributed, via the network interface, from the primary storage device to clients responsive to the respective requests from the clients. The processor may generate a dynamic priority list for the content items based on the respective requests from the clients over time, and may write, based on the dynamic priority list, only a subset of the content items to the secondary storage device.

15 Claims, 4 Drawing Sheets

(56) References Cited

U.S. PATENT DOCUMENTS

| | | | | |
|---|---|---|---|---|
| 2009/0136117 | A1* | 5/2009 | Barkol | G01N 21/94 382/145 |
| 2012/0047287 | A1* | 2/2012 | Chiu | G06F 3/0605 710/8 |
| 2012/0110036 | A1* | 5/2012 | Rabii | H04N 21/41407 707/822 |
| 2012/0159564 | A1* | 6/2012 | Spektor | H04L 63/08 718/100 |
| 2013/0132641 | A1* | 5/2013 | Suzuki | G06F 3/0605 711/E12.008 |
| 2013/0238751 | A1* | 9/2013 | Raleigh | H04L 67/26 709/217 |
| 2014/0280206 | A1* | 9/2014 | Krishnamurthy | G06F 16/958 707/748 |
| 2014/0297982 | A1* | 10/2014 | Duzett | H04N 21/2408 711/165 |
| 2017/0097781 | A1* | 4/2017 | Reimers | G06F 3/0644 |
| 2017/0134517 | A1* | 5/2017 | Bergman | H04N 21/23106 |
| 2017/0168956 | A1* | 6/2017 | van Greunen | G06F 12/123 |
| 2018/0067850 | A1* | 3/2018 | Kawamura | G06F 12/00 |
| 2018/0189289 | A1* | 7/2018 | Wexler | G06F 16/9535 |
| 2018/0210656 | A1* | 7/2018 | Sato | G06F 3/067 |
| 2018/0276063 | A1* | 9/2018 | Mendes | G06F 11/3409 |
| 2019/0028766 | A1* | 1/2019 | Wold | G06F 16/783 |
| 2019/0042126 | A1* | 2/2019 | Sen | G06F 12/06 |
| 2019/0129838 | A1* | 5/2019 | Yoshida | G06F 12/10 |
| 2019/0205467 | A1* | 7/2019 | Wold | G06F 16/686 |
| 2020/0089620 | A1* | 3/2020 | Hsu | G06F 12/1009 |
| 2020/0110553 | A1* | 4/2020 | Olarig | G06F 3/0683 |
| 2020/0142787 | A1* | 5/2020 | Thatikonda | H04L 67/1002 |
| 2020/0228854 | A1* | 7/2020 | O'Connell | G06F 40/30 |
| 2020/0233612 | A1* | 7/2020 | Dalmatov | G06F 3/0631 |
| 2020/0351344 | A1* | 11/2020 | Das Gupta | H04L 41/16 |

OTHER PUBLICATIONS

International Search Report and Written Opinion of the International Searching Authority, dated Aug. 28, 2020, Int'l Appl. No. PCT/US20/030140, Int'l Filing Date Apr. 27, 2020; 9 pgs.

International Preliminary Report on Patentability, dated Jul. 14, 2022, Int'l Appl. No. PCT/US20/030140, Int'l Filing Date Apr. 27, 2020; 8 pgs.

* cited by examiner

SYSTEMS AND METHODS FOR STORING CONTENT ITEMS IN SECONDARY STORAGE

CROSS-REFERENCE TO RELATED APPLICATIONS

This application claims the benefit of U.S. Provisional Patent Application No. 62/956,612, filed Jan. 2, 2020 and entitled "Systems and Methods for Storing Content Items in Secondary Storage," the entire contents of which are incorporated by reference herein.

BACKGROUND

A content delivery system or network (e.g., a content delivery network (CDN)) is a geographically distributed network of servers configured for facilitating an origin server to distribute content items (e.g., videos, images, web site content data, and so on) of the origin server to clients that consume the content items. Each server in the content delivery system can be referred to as a node, a machine, and so on. To distribute the content items from the origin server to clients that are geographically remote to the origin server, a node in geographical proximity to the clients can provide the content items to those clients on behalf of the origin server. In particular, the CDN can replicate and cache the content items of the origin server and provide the replicated and cached content items to the clients. The respective caches of nodes on the CDN can include primary storage, such as a memory cache in random access memory (RAM), and secondary storage, such as a mass storage device.

BRIEF SUMMARY

Provided herein are systems, apparatuses, and methods for storing content items in secondary storage.

In some configurations, a method for storing content items is provided. The method may be implemented by a computer comprising a processor, a primary storage device, a secondary storage device, and a network interface. The method may include receiving, by the primary storage device via the network interface, a plurality of content items responsive to respective requests from clients. The method also may include distributing, via the network interface, the plurality of content items from the primary storage device to clients responsive to the respective requests from the clients. The method also may include generating, by the processor, a dynamic priority list for the content items based on the respective requests from the clients over time. The method also may include writing, by the processor based on the dynamic priority list, only a subset of the content items to the secondary storage device.

Additionally or alternatively, optionally the primary storage device includes a memory cache. Optionally, the secondary storage device includes a mass storage device.

Additionally or alternatively, optionally the primary storage device receives content items at a first rate. The secondary storage device optionally receives content items at a second rate that is significantly lower than the first rate.

In some configurations, the method optionally further includes, by the processor, deleting content items from the primary storage device responsive to the respective requests from the clients.

Additionally or alternatively, optionally the processor generates the dynamic priority list based on frequencies at which the clients respectively request the content items.

Additionally or alternatively, optionally the processor generates the dynamic priority list based on numbers of times with which the clients respectively request the content items. Additionally or alternatively, optionally the processor generates the dynamic priority list based on changes in rates at which the clients respectively request the content items. Additionally or alternatively, optionally the processor generates the dynamic priority list based on respective costs of receiving the content items via the network interface. Additionally or alternatively, optionally the processor generates the dynamic priority list based on respective costs of writing the content items to the primary storage device. Additionally or alternatively, optionally the processor generates the dynamic priority list based on respective costs of writing the content items to the secondary storage device.

In some configurations, the computer optionally comprises a node of a content delivery network. Additionally or alternatively, optionally the processor receives the respective requests from the clients and distributes the plurality of content items to the clients responsive to such requests.

Additionally or alternatively, optionally the processor writes the subset of the content items from the primary storage device to the secondary storage device.

Additionally or alternatively, optionally the processor writes the subset of the content items from the network interface to the secondary storage device. As a further option, the processor generates the dynamic priority list based on whether the respective content items are available in the primary storage device.

In some configurations, a method for storing data items is provided. The method may be implemented by a computer that includes a processor, a memory cache, and a mass storage device. The method may include receiving the data items by the memory cache; generating, by the processor, a respective worthiness value of each of the data items; and writing, by the processor, only a subset of the data items from the memory cache into the mass storage device based on the respective worthiness values.

In some configurations, a computer system is provided that includes a processor, a primary storage device, a secondary storage device, and a network interface. The processor may be configured to implement operations that include receiving, by the primary storage device via the network interface, a plurality of content items responsive to respective requests from clients. The operations further may include distributing, via the network interface, the plurality of content items from the primary storage device to clients responsive to the respective requests from the clients. The operations further may include generating, by the processor, a dynamic priority list for the content items based on the respective requests from the clients over time. The operations further may include writing, by the processor based on the dynamic priority list, only a subset of the content items to the secondary storage device.

In some configurations, a computer system is provided that includes a processor, a memory cache, and a mass storage device. The processor may be configured to implement operations that include receiving the data items by the memory cache; generating, by the processor, a respective worthiness value of each of the data items; and writing, by the processor, only a subset of the data items from the memory cache into the mass storage device based on the respective worthiness values.

These and other features, together with the organization and manner of operation thereof, will become apparent from the following detailed description when taken in conjunction with the accompanying drawings.

DETAILED DESCRIPTION

Figure 1:
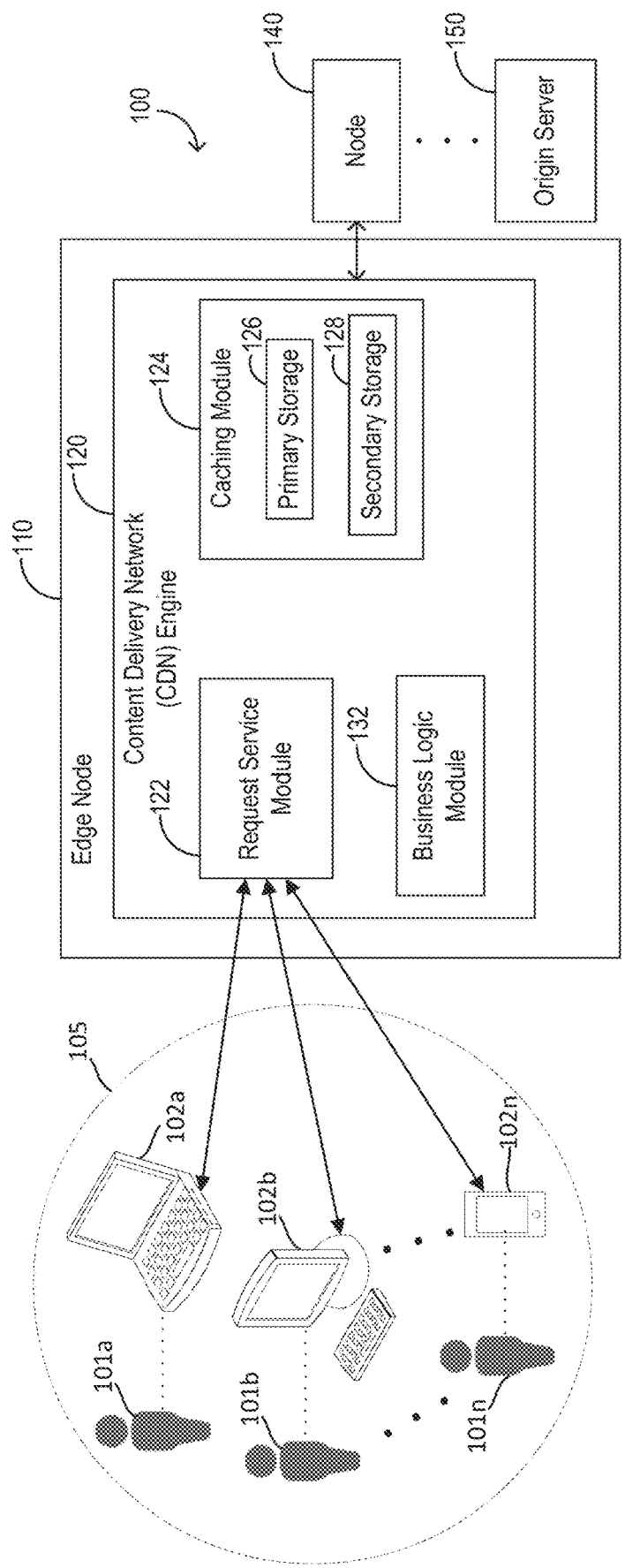
FIG. 1 is a diagram of a content delivery system according to some embodiments.

Embodiments described herein relate to systems and methods for storing content items in a secondary storage. Although certain examples provided herein describe the secondary storage of such content items in association with a content delivery system (e.g., a CDN), it should be appreciated that the present systems and methods may be implemented in any suitable computing environment and are not limited to content delivery systems such as CDNs. In a content delivery system, an edge node is a node that initially receives a request for one or more content items from a client. The client refers to a device operated by an end user who desires to consume or otherwise receive one or more of the content items provided by the origin server. The content item is or includes a portion, a segment, an object, a file, or a slice of data stored by the origin server and cached throughout the content delivery system for provisioning to one or more of the clients. The origin server refers to a device operated by a customer of the content delivery system, which facilitates the customer in delivering the content items to respective clients.

In some implementations provided herein, a computer system (for example a node, such as an edge node) includes a processor, a network interface, and both a primary storage device and a secondary storage device which respectively and independently may store content items received via the network interface. For example, the primary storage device may receive content items via the network interface responsive to respective requests from clients. Those content items then may be transmitted from the primary storage device to the respective clients via the network interface. In implementations such as provided herein, the secondary storage device may be or include a mass storage device that independently stores only a subset of the content items that are respectively requested by clients, for example based on one or more of any of a suitable number of criteria such as described herein. The primary storage device may temporarily store content items for immediate distribution responsive to client requests, whereas the secondary storage device may provide longer-term storage of only a subset of the content items for future distribution, e.g., responsive to client requests that may be received in the future. As provided herein, the processor may evaluate the respective "worthiness" of respective content items, and independently may write to the secondary storage only those content items which the processor deems to be most worthy at the time, e.g., the most likely to be requested again in the future, or satisfying one or more other criteria such as described in greater detail herein. As such, the primary and secondary storage devices may be considered to be "decoupled" from one another. Such independence of the secondary storage device from the primary storage device may provide significant computational efficiencies as compared to previously known arrangements.

For example, in previously known computer systems including both primary and secondary storage devices, the processor may be configured to automatically write every received content item first to the primary storage device (e.g., memory cache) and from there also to the secondary storage device (e.g., mass storage device). However, the present inventor has recognized that such an arrangement may lead to significant computational inefficiencies. For example, it may be relatively computationally efficient to write each content item received via the network device into the primary storage device (e.g., memory cache), because the primary storage device may be such that the processor may repeatedly write received content items thereto and read content items therefrom relatively quickly. For example, the processor may be able to repeatedly write content items to the primary storage device at a rate that at least as fast as the network interface via which the content items are received, without degrading the primary storage device.

The present inventor has recognized that also writing each received content item to the secondary storage device may cause computational inefficiencies and may delay the client's receipt of the respectively requested content item. For example, the secondary storage device may be such that the processor may write received content items thereto relatively slowly as compared to the rate at which it may write such content items to the primary storage device. Illustratively, presently available secondary storage devices such as spinning hard disk drives (HDDs) or solid state drives (SSDs) may have write speeds that at least an order of magnitude slower than the write speeds of primary storage devices such as memory cache. Additionally, repeated overwrite operations may degrade HDDs or SSDs over time, resulting in performance degradations over time and potentially the need for frequent and costly replacements. In previously known systems, if the stream of requested content items would be received into the primary storage device at a rate which exceeds the rate at which those content items may be written to the secondary storage device, the processor may intentionally reduce the rate at which the requested content is received to a level at which the secondary storage device may keep up with that stream. This may delay the clients' receipt of respective content items. Furthermore, previously known systems may write into the secondary storage device some content items which are unlikely to be requested again, which may waste computational resources and make degradation of the secondary storage device, due to the multiple write processes, all the more wasteful.

In comparison, in configurations provided herein, writing only a subset of the requested content items into the secondary storage device, independently from writing all of the content items into the primary storage device, may provide numerous computational efficiencies and may increase the speed with which clients may receive their requested content items as compared to previously known systems. For example, by reducing the number of received content items that are written to the secondary storage device from all (as previously known) to a subset (as provided herein), the processor need not necessarily reduce the rate at which requested content is received in order for the secondary storage device to keep up with the stream. As another example, reducing the number of content items that are written to the secondary storage device may reduce the rate at which the secondary storage device is overwritten, resulting in a lower rate of degradation and less need to replace the secondary storage device. Still further, the subset of content items that is written to the secondary storage device may be selected based on their apparent "worthiness" for long-term storage, meaning that computational resources need not be wasted on storing storage items that may, for example, be unlikely to be requested again by a client.

FIG. 1 is a diagram of a content delivery system 100 according to some embodiments. Referring to FIG. 1, the content delivery system 100 is configured for delivering content items provided by an origin server 150 to various clients 102a-102n. As shown, each of the users 101a-101n operates or is associated with a respective one of the clients 102a-102n for requesting and receiving the content items provided by the origin server 150 via node(s) 140, 110. In some embodiments, each of the clients 102a-102n can be a desktop computer, mainframe computer, laptop computer, pad device, smart phone device, or the like, configured with hardware and software to perform operations described herein. For example, each of the clients 102a-102n includes at least a processing circuit, a network device, and a user interface. The processing circuit is configured to perform functions of the clients 102a-102n described herein. The network device is configured to connect the clients 102a-102n to a node (e.g., an edge node 110) of the content delivery system 100. The user interface is configured for outputting (e.g., displaying media content, games, information, and so on) based on the content items as well as receiving user input from the users 101a-101n. Any suitable node or node(s) within content delivery system 100 may be configured to implement functionality for storing a subset of content items in secondary storage, such as provided herein. However, it should be appreciated that such functionality suitably may be implemented on any computing system, and is not limited to implementation on a node in a content delivery system.

In some examples, the content delivery system 100 corresponds to a CDN for delivering and distributing the content items originating from the origin server 150 to the clients 102a-102n. For example, the content delivery system 100 includes nodes 110, 140, . . . , and 150, where the origin server 150 is connected to at least one node (not shown), one of the at least one node is connected to the node 140, and the node 140 is connected to the edge node 110. The origin server 150, the node 140, the edge node 110, and other nodes in the content delivery system 100 not shown can be located in different locations, thus forming the geographically distributed content delivery system 100. While there can be additional nodes between the node 140 and the origin server 150, the node 140 can be directly connected to the origin server 150, or the node 140 can be the origin server 150. In some configurations, one or both of node 140 and edge node 110 may be configured to implement the present functionality for storing a subset of content items in secondary storage.

The content items of the origin server 150 can be replicated and cached (stored in primary or secondary storage, or both) in multiple locations (e.g., multiple nodes) throughout the content delivery system 100, including in the node 140 and other nodes (not shown). As used herein, the node 140 refers to any node in the content delivery system 100 (between the origin server 150 and the edge node 110) that stores copies of content items provided by the origin server 150. The origin server 150 refers to the source of the content items. The origin server 150 can belong to a customer (e.g., a content owner, content publisher, or a subscriber of the system 100) of the content delivery system 100 such that the customer pays a fee for using the content delivery system 100 to deliver the content items. Examples of content items include, but are not limited to, webpages and web objects (e.g., text, graphics, scripts, and the like), downloadable objects (e.g., media files, software, documents, and the like), live streaming media, on-demand streaming media, social networks, and applications (e.g., online multiplayer games, dating applications, e-commerce applications, portals, and the like), and so on.

The nodes 110, 140, and other nodes (not shown) between the edge node 110 and the origin server 150 form a "backbone" of the content delivery system 100, providing a path from the origin server 150 to the clients 102a-102n. The node 140 is upstream with respect to the edge node 110 given that the node 140 is between the edge node 110 and the origin server 150. The nodes making up a backbone may be dynamically or statically selected based on the location of those nodes, taking into consideration a number hops or links from the origin server 150 to the clients 102a-102n, latency, availability, cost, and other suitable criteria. In some embodiments, the edge node 110 is referred to as an "edge node" given the proximity of the edge node 110 to the clients 102a-102n. For example, the clients 102a-102n that are in an area 105 may be associated with and connected to the edge node 110 given the proximity of the edge node 110 to the clients 102a-102n. In other words, the edge nodes 110 is on the edge of the content delivery system 100, and the edge node 110 is directly connected to the clients 102a-102n. Typically, the closer an edge node is to clients connected thereto, the less latency those clients experience with respect to receiving the content items from that edge node. Thus, performance is contingent upon the geographical proximity of the edge node 110 to the clients 102a-102n. CDN providers typically place the edge nodes as close to intended clients as practicable. Thus, the edge node 110 can be located within the area 105. In some embodiments, the edge node 110 may be directly connected to the origin server 150.

In some embodiments, the node 140 (and other nodes between the node 140 and the origin server 150 not shown) is referred to as an "intermediate node." The intermediate nodes link the edge nodes to the origin server 150 via various network links or "hops." The intermediate nodes can provide the content items (and updates thereof) to the edge nodes. That is, the origin server 150 can provide the content items (and updates thereof) to the edge node 110 through the node 140, if the edge node 110 does not currently cache (store in primary or secondary storage) a copy of the content items respectively requested by the clients 102a-102n.

Each link between one of the clients 102a-102n and the edge node 110 corresponds to a suitable network connection for exchanging data, such as content items. In addition, each link between two of the nodes/servers 110, 140, . . . , and 150 represents a suitable network connection for exchanging data. A network connection is structured to permit the exchange of data, values, instructions, messages, and the like among the clients 102a-102n, the nodes 110, 140, and so on, and the origin server 150 in the manner shown. The network connection can be any suitable Local Area Network (LAN) or Wide Area Network (WAN) connection. For example, each network link can be supported by Frequency Division Multiple Access (FDMA), Time Division Multiple Access (TDMA), Synchronous Optical Network (SONET), Dense Wavelength Division Multiplexing (DWDM), Optical Transport Network (OTN), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like.

As shown, the edge node 110 includes a CDN engine 120 that includes any suitable number of modules configured to perform functions of edge node 110. It should be appreciated that any given module may be configured so as to perform a plurality of functions such as provided herein. In the nonlimiting example illustrated in FIG. 1, CDN engine includes request service module 122, caching module 124, and business logic module 132. Request service module 122 may be configured to process requests for content (e.g., HTTP requests) received from the clients 102a-102n, Caching module 124 may be configured to receive and store at least into primary storage 126, and optionally into secondary storage 128, a subset of the requested content items in case additional clients request the same content items at a later time. The request service module 122 may include a HTTP service module configured to receive and process HTTP requests received from the clients 102a-102n. The request service module 122 is configured for suitable protocols (e.g., HTTP) for receiving and processing the HTTP request. In other words, the request service module 122 is configured to answer the HTTP requests, for content items, from the end users 101a-101n in the manner described. In some configurations, caching module 124 includes or is operatively coupled to primary storage 126 and secondary storage 128. Caching module 124 is configured to store received content items in primary storage 126, to select only a subset of the content items for storage in secondary storage 128, and to store that subset into secondary storage 128 in a manner such as described in greater detail elsewhere herein.

Business logic module 132 may be configured to implement business logics at the edge node 110, e.g., for authentication, providing business information to caching module 124 for use in maintaining correct statistics and logs, calculating cache key, and so on. For example, the business logic module 132 is configured to determine whether the content items requested by the clients 102a-102n belongs to a valid customer of the content delivery system 100, whether the rules of the customer allow the content items to be serviced to the clients 102a-102n, whether the rules of the content delivery system 100 allow the content items to be serviced to the clients 102a-102n, and so on.

Modules within CDN engine 120 may be loosely or tightly coupled, or coupled to various degrees between those extremes, with the coupling varying with regard to the specific functions being performed. For example, business logic module 132 may require information held within caching module 124 (including but not limited to popularity data, resource age data, resource size data, recent access pattern data, and the like) in order to make its decision or decisions, and it therefore may be tightly coupled with the caching module for those purposes, whereas for other functions, there may be little or no coupling. Nothing in this application should be construed as placing a restriction on or a requirement for any particular degree of coupling between or arrangement of the various disclosed modules mentioned in any of the possible embodiments described herein.

Other configurations of content delivery system 100 suitably may be implemented. For example, caching module 124 and business logic module 132 may be provided on different nodes than one another, which nodes may be operatively coupled via a network structured to permit the exchange of data, values, instructions, messages, and the like. Such network can be any suitable LAN or WAN connection. For example, the network can be supported by FDMA, TDMA, SONET, DWDM, OTN, CDMA (particularly, EVDO), UMTS (particularly, TD-SCDMA or TDS WCDMA, LTE, eMBMS, HSDPA, and the like), UTRA, GSM, 1x, GPRS, PCS, 802.11X, ZigBee, Bluetooth, Wi-Fi, any suitable wired network, combination thereof, and/or the like.

Figure 2:
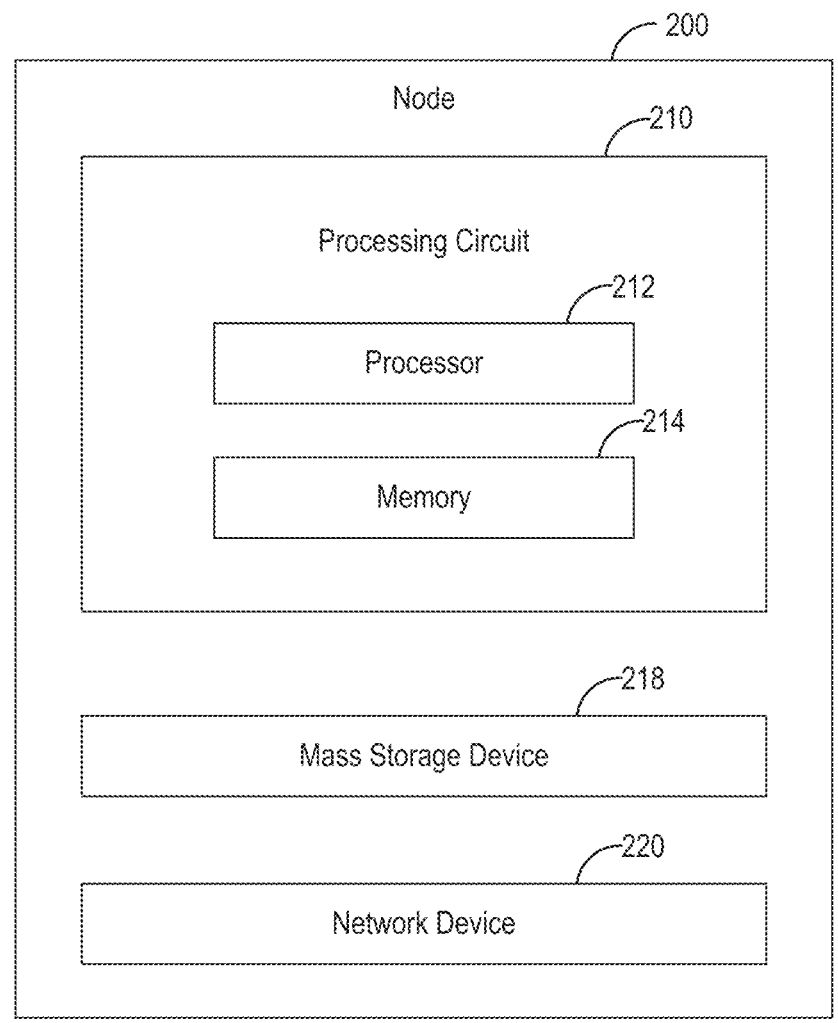
FIG. 2 is a block diagram that illustrates a node according to some embodiments of the present disclosure.

FIG. 2 is a block diagram that illustrates a node 200 according to some embodiments. Referring to FIGS. 1-2, the node 200 is a non-limiting example of any suitable one or more of nodes 110, 140, and nodes (if any) between the node 140 and the origin server 150 in some embodiments. As shown, the node 200 includes one or more of a processing circuit 210, mass storage device 218, and network device 220.

The processing circuit 210 is configured to perform various functions described herein relative to the node 200. For example, the processing circuit 210 of the edge node 110 (FIG. 1) may be configured to implement one or more functions of CDN engine 120, e.g., the caching module 124, and optionally also the business logic module 132. The processing circuit 210 includes a processor 212 and a memory 214. The processor 212 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. Memory 214 may be or include primary storage device 126 described with reference to FIG. 1. The memory 214 can, for example, be implemented with a Random Access Memory (RAM), Read-Only Memory (ROM), Non-Volatile RAM (NVRAM), flash memory, hard disk storage, or another suitable data storage unit. The memory 214 stores data and/or computer code for facilitating the various processes executed by the processor 212. Moreover, the memory 214 is or includes tangible, non-transient volatile memory or non-volatile memory. Accordingly, the memory 214 includes database components, object code components, script components, or any other type of information structure for supporting the various functions described herein. Mass storage device 218 may be or include secondary storage device 128 described with reference to FIG. 1. The mass storage device 218 can, for example, be implemented with a HDD or SSD.

The network interface 220 is structured to establish communication with clients (e.g., the clients 102a-102n), other nodes in the content delivery system 100, and/or the origin server 150. In some examples, the network interface 220 is configured to establish the network 140a. The network interface 220 includes hardware and software for achieving such. In some implementations, the network interface 220 includes a cellular transceiver (configured for cellular standards), a local wireless network transceiver (for 802.11X, ZigBee, Bluetooth, Wi-Fi, or the like), a wired network interface, a combination thereof (e.g., both a cellular transceiver and a Bluetooth transceiver), and/or the like.

Figure 3:
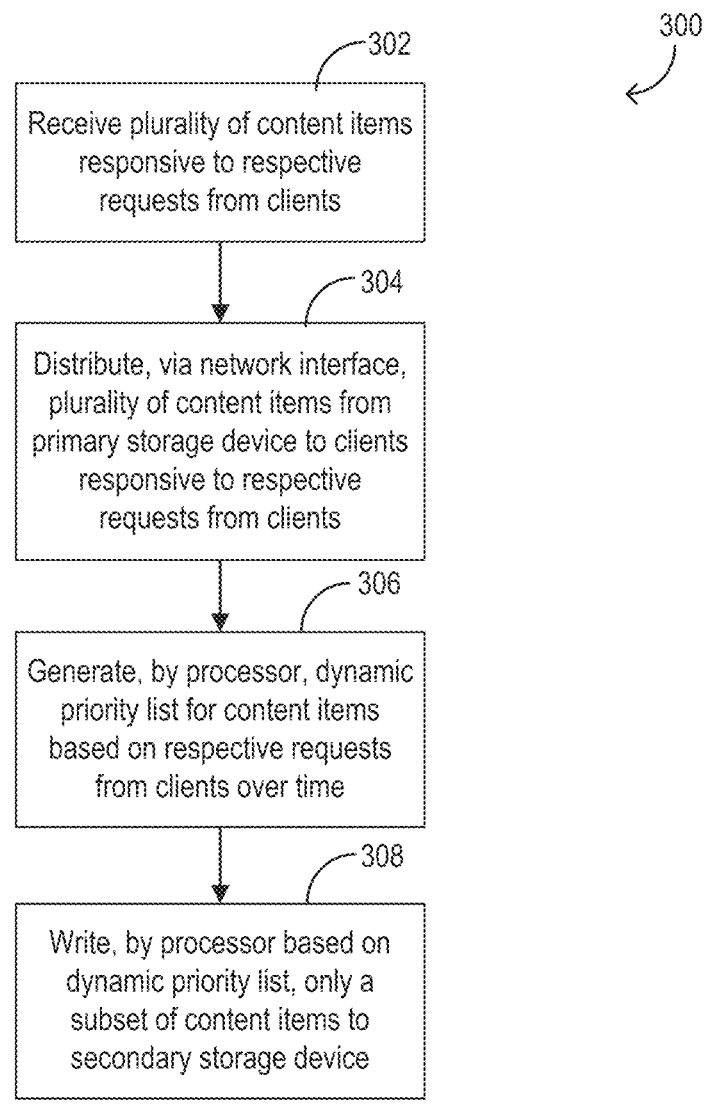
FIG. 3 is a flow diagram illustrating a method for storing content items in secondary storage according to various embodiments.

Any suitable one or more computers or processing circuits within content delivery system 100 or node 200, respectively described with reference to FIGS. 1-2, or any other suitable computer or processing circuit, may be configured for use in a method for storing content items in secondary storage devices, in a manner such as provided herein. For example, FIG. 3 illustrates a flow of operations in an exemplary method 300 for storing content items according to various configurations provided herein. Method 300 described with reference to FIG. 3 may be implemented by any suitable computer comprising a processor, a primary storage device, a secondary storage device, and a network interface. As described in greater detail above, the primary storage device may receive content items at a first rate, and the secondary storage device may receive content items at a second rate that is significantly lower than the first rate, which in previously known systems may cause computational inefficiencies. As one example, the primary storage device may include a memory cache such as RAM, and the secondary storage device may include a mass storage device such as an HDD or SSD.

Referring to FIG. 3, method 300 may include an operation of receiving, by the primary storage device via the network interface, a plurality of content items responsive to respective requests from clients (operation 302). For example, request service module 122 within edge node 110 of content delivery system 100 illustrated in FIG. 1 may receive various requests from clients 102a . . . 102n for respective content items over time. An example of the request is an HTTP request. The request can be received from the cloud and/or from the internet. Responsive to each such client request, request service module 122 may send an authentication request to business logic module 132 to authenticate the client request, to which the business logic module 132 may respond by indicating whether the client request may be serviced. If the business logic module 132 indicates that the client request may be serviced, caching module 124 may determine whether the requested content item is already stored in primary storage 126 or in secondary storage 128. If the requested content item is not already stored in primary storage 126 or secondary storage 128, then caching module 124 sends a content request to an upstream node 140 or to origin server 150 for that content item. Responsive to that content request, primary storage 126 of caching module 124 receives the content item via a network interface (e.g., network device 220 described with reference to FIG. 2). If the requested content item is already stored in primary storage 126 or in secondary storage 128, then caching module 124 need not send such a content request, and may transfer any appropriate content items from secondary storage 128 to primary storage 126 for distribution. In a manner such as known in the art and as described in greater detail below, caching module 124 may delete certain content items from primary storage device 126 responsive to the respective requests from the clients. For example, the primary storage device may have a limited capacity for storing content items. Therefore in order to write additional content items into the primary storage device 126 responsive to client requests, caching module 124 may selectively delete older content items from the storage device in order to make room for new ones. A variety of algorithms for managing content items within a primary storage device, which may be known as "cache management" algorithms, are known in the art, although the present configurations are not limited thereto.

Referring again to FIG. 3, method 300 includes distributing, via the network interface, the plurality of content items from the primary storage device to clients responsive to the respective requests from the clients (operation 304). For example, responsive to respective requests from clients 102a . . . 102n, request service module 122 transmits content items from primary storage 126 to such clients via a network interface (e.g., network device 220 described with reference to FIG. 2).

Referring again to FIG. 3, method 300 includes generating, by the processor, a dynamic priority list for the content items based on the respective requests from the clients over time (operation 306). That is, at any given time the processor identifies which of the content items should have the highest priority to be written to the secondary storage device, which of the content items should have the next highest priority to be written to the secondary storage device, and so on. The priority list may be dynamic—that is, may change over time—responsive to different requests from the clients over time, in a manner such as described below. Example criteria for generating the dynamic priority list are described in greater detail below. Method 300 illustrated in FIG. 3 also may include writing, by the processor based on the dynamic priority list, only a subset of the content items to the secondary storage device (operation 308). The remaining content items may remain in the primary storage device, for example until they are deleted in a manner such as described with reference to operation 302. Operations 306 and 308 of method 300 may be implemented by any suitable processor coupled to a primary storage device and a secondary storage device. In one example, caching module 124 described with reference to FIG. 1, or processing circuit 210 described with reference to FIG. 2, may be configured so as to implement operations 306 and 308.

Note, however, that the processor implementing operations 306 and/or 308 of method 300 may be, but need not necessarily be, the same processor implementing operations 302 and/or 304. For example, a first processor may receive the respective requests from the clients (operation 302) and may distribute the plurality of content items to the clients responsive to such requests (operation 304). In some configurations, the first processor may generate the dynamic priority list (306) or may write the subset of the content items from the primary storage device to the secondary storage device (operation 308). In other configurations, a second processor may generate the dynamic priority list (306) or may write the subset of the content items from the primary storage device to the secondary storage device (operation 308). The second processor may be configured so as to manage the writing of the subset of content items onto the second storage device, while the first processor may be configured so as to manage the writing of the content items onto the first storage device. For example, the second processor may write the subset of the content items from the network interface to the secondary storage device, rather than writing the subset of content items from the first storage device to the second storage device.

In configurations such as described with reference to FIGS. 1-2, it may be useful for the processor to generate the dynamic priority list for the content items based on the respective requests from the clients for those content items over time, for example because the frequency or timing of those requests may relate to the likelihood that such content items will be requested again. Illustratively, if only a single client requests a particular content item within a given period of time, then it is unlikely that another client may request that content item during a subsequent period of time. As such, it may be appropriate for the processor to place that content item low on the priority list for writing to the secondary storage device so that additional computational resources are not wasted on it. On the other hand, if multiple clients request a particular content item over an extended period of time, then it may be likely that still more clients may request that item during a subsequent period of time. As such, it may be appropriate for the processor to place that content item higher on the priority list for writing to the secondary storage device so that it may be stored locally, rather than expending additional computational resources in retrieving that content item again from an upstream node or an origin server. In another example, if multiple clients request a particular content item within a short amount of time but not thereafter, then it may be unlikely that additional clients may request that item during a subsequent period of time. An example of such a content item may be a live broadcast, which may be of interest to many users during the time period immediately after that broadcast, but not of much interest thereafter. As such, it may be appropriate for the processor to place that content item low on the priority list for writing to the secondary storage device so that additional computational resources are not wasted on it. In these and any other scenarios, the processor may periodically or continuously update the dynamic priority list based on respective requests from the clients for those content items over time, as the interests of users may fluctuate over time.

The processor may be configured so as to generate the dynamic priority list based on any suitable criterion or combination of criteria. For example, in some configurations, the processor generates the dynamic priority list based on frequencies at which the clients respectively request the content items. These frequencies may change over time. Illustratively, at a given time, the processor may be configured to place higher on the dynamic priority list a content item which is requested with the higher frequency at that time, than a content item which is requested with a lower frequency at that time, and so on. In another example, in some configurations, the processor generates the dynamic priority list based on numbers of times with which the clients respectively request the content items. Illustratively, at a given time, the processor may be configured to place higher on the dynamic priority list a content item which has been requested a greater number of times at that time, than a content item which is requested a lower number of times at that time, and so on.

In still another example, in some configurations, the processor generates the dynamic priority list based on changes in rates at which the clients respectively request the content items. Illustratively, at a given time, the processor may be configured to place higher on the dynamic priority list a content item with the greatest increase in rate of client requests at that time, than a content item with a lower increase in rate of client requests at that time, and so on. However, certain types of content items like live broadcasts may be of interest to many users during and immediately following that broadcast, but not of much interest thereafter. Such content items may have a relatively large increase in the rate of client requests in a short amount of time, and from this increase in rate the processor may determine that it is more appropriate to place that content item low on the priority list for writing to the secondary storage device so that additional computational resources are not wasted on it. As such, in some configurations the processor may be configured to place higher on the dynamic priority list a content item that has a lower increase in rate of client requests than a content item with a higher increase in rate of requests. Additionally, or alternatively, the processor may compare a content item's change in rate of client requests to a predetermined threshold (e.g., a threshold indicative of a live broadcast), at that time, and place the content item higher or lower in the dynamic priority list based on that comparison. Similarly, the processor may place content items on the dynamic priority list based on their respective time of last request by a client, with more recently requested content items being ranked higher than less recently requested content items.

In yet another example, the processor generates the dynamic priority list based on respective costs of receiving the content items via the network interface. In this context, "costs" may refer to computational costs of respectively acquiring the content items from another computer, such as an origin server. A content item with a relatively low computational cost may be one with a relatively small file size that may be obtained from an origin server relatively quickly and with low consumption of network resources. A content item with a relatively high computational cost may have a relatively large file size that may be time-consuming to transfer from the origin server over the network. It therefore may save computational resources to write content items with higher computational costs into the secondary storage so as to avoid having to expend computational resources on obtaining those content items again via the network at a later time. As such, the processor may be configured to place higher on the dynamic priority list a content item with a higher cost of receiving it over the network interface at that time, than a content item with a lower cost of receiving over the network interface at that time.

In yet another example, the processor generates the dynamic priority list based on respective costs of writing the content items to the primary storage device. In this context, "costs" may refer to computational costs of respectively writing the content items to the primary storage device. A content item with a relatively low computational cost may be one with a relatively small file size that may be written relatively easily to the primary storage device. A content item with a relatively high computational cost may have a relatively large file size that may be time-consuming to write to the primary storage device. It therefore may save computational resources to write content items with higher computational costs into the secondary storage so as to avoid having to expend computational resources on writing those content items into the primary storage device at a later time. As such, the processor may be configured to place higher on the dynamic priority list a content item with a higher cost of writing it to the primary storage device at that time, than a content item with a lower cost of writing to the primary storage device at that time.

In still another example, the processor generates the dynamic priority list based on respective costs of writing the content items to the secondary storage device. In this context, "costs" may refer to the expected degradation of the secondary storage device as a result of writing the content items to that device. A content item with a relatively low cost may be one which may be expected to be read multiple times from the secondary storage device and/or may have a relatively small file size that may be written relatively easily to the secondary storage device. A content item with a relatively high cost may be one which may expected to be infrequently or never read from the secondary storage device and/or may have a relatively large file size that may be time-consuming to write to the secondary storage device. It therefore may save computational resources to write content items with lower costs into the secondary storage so as to avoid degrading the secondary storage on account of writing those content items into the secondary storage device. As such, the processor may be configured to place higher on the dynamic priority list a content item with a lower cost of writing it to the secondary storage device at that time, than a content item with a higher cost of writing to the secondary storage device at that time.

The processor may be configured so as to use any suitable combination of one or more of such criteria or other appropriate criteria or criterion. For example, in some configurations the processor may be configured to generate the dynamic priority list based directly on the stream of client requests (e.g., rather than based on contents of the primary storage), but may retrieve content items from the primary storage in priority order based on the dynamic priority list. As noted elsewhere herein, content items may be deleted from the primary storage device, e.g., as part of cache management. As such, not all content items in the stream of client requests necessarily may be present in the primary storage device. As another criterion, which optionally may be combined with other criteria such as described herein, the processor may be configured to determine whether content items in the request stream are respectively stored in the primary storage device, and to place lower on the dynamic priority list a content item which is not stored in the primary storage device. That is, the processor may generate the dynamic priority list based on whether the respective content items are available in the primary storage device.

The processor optionally may generate for each content item a "worthiness value" indicating the respective value to the computing system of writing that content item to the secondary storage device, as opposed to maintaining that content item only in the primary storage device from which it ultimately may be deleted as described above with reference to operation 302. The content item with the highest worthiness value may be highest on the dynamic priority list, and the processor may write content items to the secondary storage in descending order of worthiness value, or may write content items to the secondary storage based upon their worthiness values exceeding a predefined threshold. Purely by way of example, the processor may assign to each content item stored in the primary storage device a worthiness value corresponding to the number of times that a client respectively requests that content item, and thus may generate the dynamic priority list based on numbers of times with which the clients respectively request the content items. The worthiness value of each content item may, for example, be incremented each time that item is requested, or otherwise based on the popularity of the content item. The processor may write content items to the secondary storage in descending order of worthiness value, or based upon their worthiness values exceeding a predefined threshold. The worthiness value of a content item may be based on any suitable criterion or combination of criteria, such as those provided herein (e.g., frequency of request, number of times of request, rate of request, cost of receiving, cost of writing to primary storage, cost of writing to secondary storage).

Figure 4:
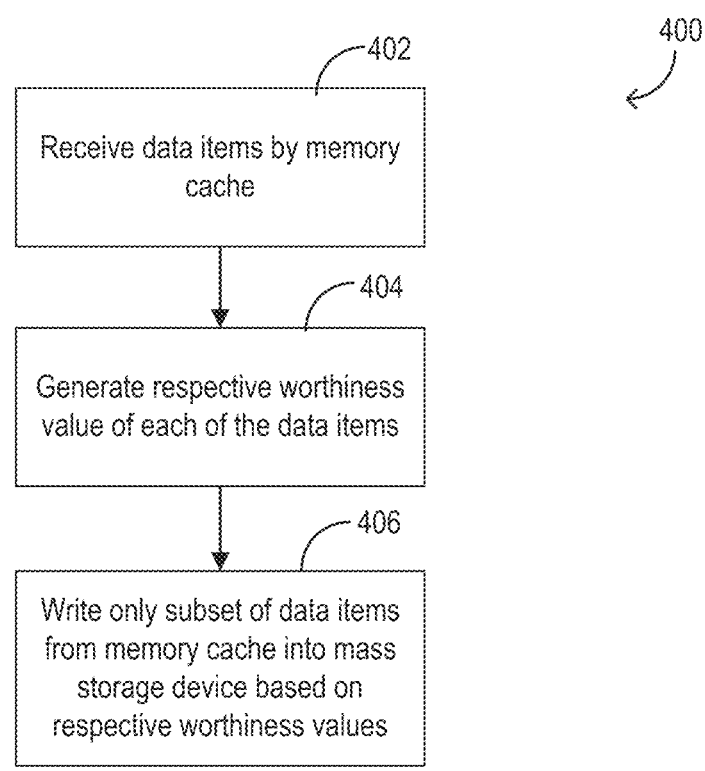
FIG. 4 is a flow diagram illustrating a method for storing data items in a mass storage device according to various embodiments.

It should be appreciated that configurations provided by the present subject matter are not limited to implementation in a content delivery system, and are not limited to management of content items. Instead, any suitable data items may be written into any suitable memory device by any suitable processor. FIG. 4 is a flow diagram illustrating a method for storing data items in a mass storage device according to various embodiments. Method 400 illustrated in FIG. 4 may be performed by a suitably programmed computer comprising a processor, a memory cache, and a mass storage device. Method 400 may include receiving the data items by the memory cache (operation 402). Examples of suitable memory caches are provided elsewhere herein. The data items may include any suitable types of files or data, and are not limited to the examples of content items provided elsewhere herein. Method 400 may include generating, by the processor, a respective worthiness value of each of the data items (operation 404). The worthiness values of data items may be generated based on any suitable criterion or combination of criteria, such as those provided herein (e.g., frequency of request, number of times of request, rate of request, cost of receiving, cost of writing to memory cache, cost of writing to the mass storage device). Method 400 may include writing, by the processor, only a subset of the data items from the memory cache into the mass storage device based on the respective worthiness values (operation 406), e.g., in a manner similar to that described herein in which the processor writes a subset of content items from the primary storage device to the secondary storage device.

It should be appreciated that in configurations including business logic module 132, that module may be configured so as to observe and process every request that clients make for respective content items, e.g., in a manner such as described herein. Caching module 122 optionally may be configured so as to inform business logic module 132 about the current cache states of respective content items, and the business logic module optionally may be configured to calculate a worthiness value of each such content item and inform caching module 122 of that worthiness value, e.g., of the worthiness of committing that content item to secondary storage.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices, such as one or more primary storage devices or secondary storage devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, ASICs, FPGAs, DSPs, or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the system, for example the one or more processors may be a remote processor (e.g., a cloud based processor). Alternatively or additionally, the one or more processors may be internal and/or local to the system. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computer, special purpose computer, or special purpose processing machine including a processing unit, a system memory device, and a system bus that couples various system components including the system memory device to the processing unit. The system memory may be or include the primary storage device and/or the secondary storage device. One or more of the system memory, primary storage device, and secondary storage device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method for storing content items, the method being implemented by a computer comprising a processor, a primary storage device, a secondary storage device, and a network interface, the method comprising:
receiving, by the primary storage device via the network interface, a plurality of content items responsive to respective requests from clients;
distributing, via the network interface, the plurality of content items from the primary storage device to clients responsive to the respective requests from the clients;
generating, by the processor, a worthiness value for each content item of the plurality of content items, wherein the worthiness value is indicative of a value for writing the respective content item to the primary storage device compared to other content items of the plurality of content items, and the worthiness value is based on a combination of at least frequency of request, rate of request, and number of times of request for the respective content item;
generating, by the processor, a dynamic priority list for the content items based on the respective requests from the clients over time, based on the generated worthiness values, and based on respective costs of writing the content items to the secondary storage device, wherein the respective costs is based on at least expected degradation of the secondary storage device as a result of writing the content items to the secondary storage device;

writing, by the processor based on the dynamic priority list, only a subset of the content items to the secondary storage device.

2. The method of claim 1, wherein the primary storage device comprises a memory cache, and wherein the secondary storage device comprises a mass storage device.

3. The method of claim 1, wherein the primary storage device receives content items at a first rate, and wherein the secondary storage device receives content items at a second rate that is lower than the first rate.

4. The method of claim 1, further comprising, by the processor, deleting content items from the primary storage device responsive to the respective requests from the clients.

5. The method of claim 1, wherein the processor generates the dynamic priority list based on frequencies at which the clients respectively request the content items.

6. The method of claim 1, wherein the processor generates the dynamic priority list based on numbers of times with which the clients respectively request the content items.

7. The method of claim 1, wherein the processor generates the dynamic priority list based on changes in rates at which the clients respectively request the content items.

8. The method of claim 1, wherein the processor generates the dynamic priority list based on respective costs of receiving the content items via the network interface.

9. The method of claim 1, wherein the processor generates the dynamic priority list based on respective costs of writing the content items to the primary storage device.

10. The method of claim 1, wherein the computer comprises a node of a content delivery network.

11. The method of claim 1, wherein the processor receives the respective requests from the clients and distributes the plurality of content items to the clients responsive to such requests.

12. The method of claim 1, wherein the processor writes the subset of the content items from the primary storage device to the secondary storage device.

13. The method of claim 1, wherein the processor writes the subset of the content items from the network interface to the secondary storage device.

14. The method of claim 13, wherein the processor generates the dynamic priority list based on whether the respective content items are available in the primary storage device.

15. A computer system comprising a processor, a primary storage device, a secondary storage device, and a network interface, the processor being configured to implement operations comprising:

receiving, by the primary storage device via the network interface, a plurality of content items responsive to respective requests from clients;

distributing, via the network interface, the plurality of content items from the primary storage device to clients responsive to the respective requests from the clients;

generating, by the processor, a worthiness value for each content item of the plurality of content items, wherein the worthiness value is indicative of a value for writing the respective content item to the primary storage device compared to other content items of the plurality of content items, and the worthiness value is based on a combination of at least frequency of request, rate of request, and number of times of request for the respective content item;

generating, by the processor, a dynamic priority list for the content items based on the respective requests from the clients over time, based on the generated worthiness values, and based on respective costs of writing the content items to the secondary storage device, wherein the respective costs is based on at least expected degradation of the secondary storage device as a result of writing the content items to the secondary storage device;

writing, by the processor based on the dynamic priority list, only a subset of the content items to the secondary storage device.

\* \* \* \* \*